United States Patent [19]

Grogen et al.

[11] Patent Number: 5,635,429
[45] Date of Patent: Jun. 3, 1997

[54] METHOD OF MAKING A SUBSTRATE OF A CERAMIC MATERIAL

[75] Inventors: Wilhelm A. Grogen; Marcellinus J. Kraan; Paulus F. Van Hal; Gijsbertus De With, all of Eindhoven, Netherlands

[73] Assignee: U.S. Philips Corporation, New York, N.Y.

[21] Appl. No.: 682,216

[22] Filed: Jul. 17, 1996

Related U.S. Application Data

[62] Division of Ser. No. 568,774, Dec. 7, 1995, Pat. No. 5,571,757.

[30] Foreign Application Priority Data

Dec. 12, 1994 [EP] European Pat. Off. .............. 94203601

[51] Int. Cl.$^6$ .......................... C04B 35/56; C04B 35/581
[52] U.S. Cl. ........................................ 501/87; 501/98.4
[58] Field of Search ................................. 501/87, 98

[56] References Cited

U.S. PATENT DOCUMENTS

| | | |
|---|---|---|
| 4,320,203 | 3/1982 | Brandt et al. . |
| 5,023,212 | 6/1991 | Dubots et al. . |
| 5,075,265 | 12/1991 | Narula . |

FOREIGN PATENT DOCUMENTS

0490480A1  10/1991  European Pat. Off. .

*Primary Examiner*—Karl Group
*Attorney, Agent, or Firm*—Daniel E. Tierney; Arthur G. Schaier

[57] ABSTRACT

The invention relates to a substrate made from a novel type of ceramic material. This material comprises 44–47 at. % Al, 31–39 at. % O, 8–13 at. % C and 8–12 at. % N. Substrates made from this material exhibit a relatively high heat conductance, a relatively great strength and their coefficient of expansion is equal to that of Si. Consequently, the substrates in accordance with the invention are very suitable for use in the Si-semiconductor technology. The main component of the ceramic material of the substrates preferably corresponds to the formula $Al_{28}O_{21}C_6N_6$. The invention also provides methods of manufacturing substrates and other mouldings from this material.

10 Claims, 1 Drawing Sheet

METHOD OF MAKING A SUBSTRATE OF A CERAMIC MATERIAL

This is a division of application Ser. No. 08/568,774, filed Dec. 7, 1995, now Patent No. 5,571,757.

The invention relates to a substrate made from a ceramic material. The invention also relates to a ceramic material and to methods of manufacturing such a ceramic material.

BACKGROUND OF THE INVENTION

Substrates made from a ceramic material are known per se. They are generally composed of a thin sheet of sintered ceramic material, such as the binary compounds aluminum oxide ($Al_2O_3$), magnesium oxide (MgO), beryllium oxide (BeO), aluminium nitride (AlN) or silicon carbide (SiC). Substrates made from ternary compounds, such as $MgSiN_2$, are also known. Because of their satisfactory electrically insulating properties, the known substrates are used in passive and active electrical components, such as resistors, capacitors, transformers and power transistors. In these applications, they serve as supports of current-conducting structures. In U.S. Pat. No. 5,411,924, filed by Applicant, the advantages and disadvantages of a number of substrates are briefly stated.

An important field of application of ceramic substrates is formed by the Si-semiconductor technology. Substrates suitable for said technology must have a high electrical resistance R (ohm), a satisfactory strength σ (MPa) and a high thermal conductance, k (W/m.K). In addition, the coefficient of expansion α (1/K) of the substrates should be substantially equal to that of Si. The last-mentioned measure ensures that Si structures provided on the substrate do not crack and/or become detached under the influence of variations in temperature. The coefficient of expansion of silicon is approximately $4.8.10^{-6} K^{-1}$.

As a result of these requirements, the use of magnesium oxide and aluminium oxide as the substrate material is not optimal because their thermal conductance is too low and their coefficient of expansion is too high. These disadvantages apply in particular when these substrates are used in large Si-semiconductor structures and/or "power devices". The coefficient of expansion of $MgSiN_2$ ($5.8 \times 10^{-6}$) is much closer to that of Si than that of aluminum oxide and magnesium oxide. However, particularly in the case of relatively large substrate surfaces of $MgSiN_2$, on which complex semiconductor structures are provided, the difference between the coefficients of expansion of Si and $MgSiN_2$ is still too large. Ceramic substrates of silicon carbide are relatively expensive because this material is difficult to process. In addition, silicon carbide has a relatively high dielectric constant. As a result, this material is less suitable for use as a substrate in electronic components. Ceramic bodies of beryllium oxide have the important disadvantage that they comprise toxic beryllium. Substrates of aluminium nitride exhibit a favourable, high thermal conductance (approximately 150 W/m.K) and a coefficient of expansion ($4.8.10^{-6} K^{-1}$) which is substantially identical to that of Si. However, this material is difficult to manufacture and hence relatively expensive.

SUMMARY OF THE INVENTION

It is an object of the invention to provide a substrate of a ceramic material which does not have the above-mentioned disadvantages. The invention more particularly aims at providing a ceramic substrate which has a relatively high thermal conductance, a coefficient of expansion substantially equal to that of Si and which can be manufactured relatively easily and hence at low cost.

These and other objects of the invention are achieved by a substrate of a ceramic material which is characterized in accordance with the invention in that the material comprises 44–47 at. % Al, 31–39 at. % O, 8–13 at. % C and 8–12 at. % N.

It has been found that a ceramic substrate whose composition is in accordance with the invention has substantially ideal properties for use in the Si-semiconductor technology. For example, the coefficient of expansion of the inventive substrate material is equal to that of Si, namely $4.8 \times 10^{-6}$. In addition, the theorectical thermal conductance at 300K is approximately 120 W/m.K. Further, the strength of the material is 295 MPa. These data show that the material has approximately the same favourable properties as AlE. Substrates in accordance with the invention, however, are much simpler and hence much cheaper to manufacture.

Experiments leading to the invention have shown that substantially monophase material can only be obtained within the above-mentioned composition range. Compositions outside this range generally comprise considerable quantities of other phases, such as aluminium oxide, aluminium oxynitride and/or aluminum oxycarbide. The presence of such foreign phases causes unfavourable properties, such as a substantial reduction of the thermal conductance. It is noted that a small part (up to 10 at. %) of Al can be replaced by B without this leading to a drastic change of the structure and properties of the inventive substrate.

The composition of the main component of the inventive substrate preferably corresponds to the formula $Al_{28}O_{21}C_6N_6$. The above-mentioned properties regarding thermal conductance, coefficient of expansion and strength are found to be optimal in substrates of this material composition. It is noted that the error in the element analysis of the composition is approximately 1 at. % per element. It is further noted that the composition formula is based on the crystal structure of the inventive material. The overall composition may differ slightly from the composition based on the crystal structure. This may be caused by the fact that the glass phase of the ceramic material differs from the crystalline phase. The glass phase is situated between the crystalline grains. The expression "main component" is to be understood to mean herein the crystalline phase of the material.

The invention also relates to a ceramic material. In accordance with the invention, this material is characterized in that it comprises 44–47 at. % Al, 31–39 at. % O, 8–13 at. % C and 8–12 at. % N. Preferably, the composition of the main component of the material corresponds to the formula $Al_{28}O_{21}C_6N_6$. The ceramic material in accordance with the invention may be in the form of a moulding or a powder.

The invention also relates to a method of manufacturing a ceramic material. A first embodiment is characterized in that the method comprises the following steps a) pre-firing a mixture of $Al_2O_3, Al_4C_3$ AlN in a ratio based on the intended composition of the ceramic material, b) grinding the pre-fired product thus formed into a powder, c) sintering the powder to form a ceramic material.

By means of the inventive method, a substantially monophase material is obtained which comprises 44–47 at. % Al, 31–39 at. % O, 8–13 at. % C and 8–12 at. % N. Pre-firing preferably takes place in the temperature range between 1500 and 1700° C., and sintering preferably takes place in the temperature range between 1700 and 1900° C. Under these conditions, the quantity of foreign-phase material is less than 20 wt. %.

A second embodiment of the inventive method is characterized in that a mixture of $Al_2O_3$, $Al_4C_3$ and AlN, in a ratio based on the intended composition of the ceramic material, is sintered under pressure to form the ceramic material. This method is commonly referred to as reactive sintering. In this method, pre-firing and grinding of the pre-fired product formed are dispensed with.

These and other aspects of the invention will be apparent from and elucidated with reference to the embodiments described hereinafter.

DESCRIPTION OF THE PREFERRED EMBODIMENTS

Figure 1:
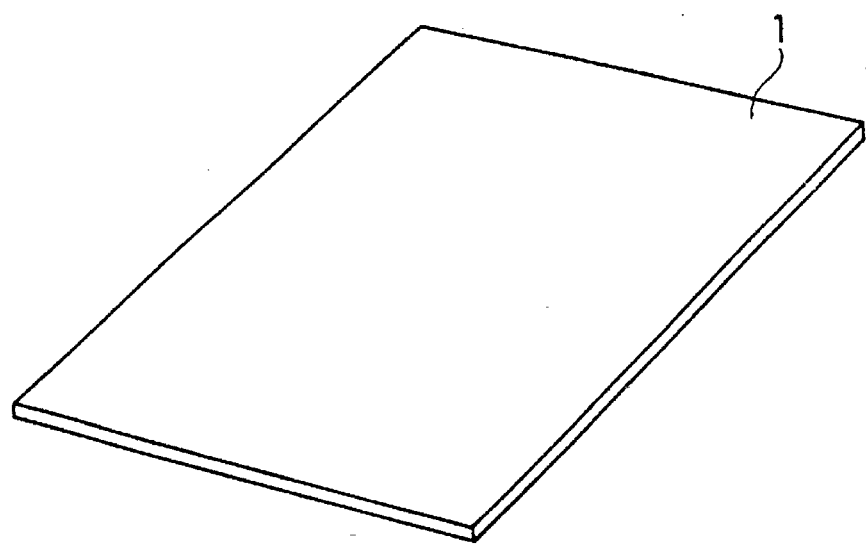
FIG. 1 shows a substrate of a ceramic material in accordance with the invention.

In FIG. 1, reference numeral (1) refers to a flat substrate of a ceramic material. The dimensions of this substrate are 40×60×4 mm³. The composition of the main component of this ceramic material corresponds to the formula $Al_{28}O_{21}C_6N_6$. The substrate was manufactured as described hereinbelow.

The starting materials used were powders of $Al_2O_3$ (CR-56, Baikowski), $Al_4C_3$ (WI, Cerac) and AlN (Tolmyoma Soda, F-Grade). These starting materials were used to prepare a mixture comprising 57.2 wt. % aluminium oxide, 23.1 wt. % aluminum carbide and 19.7 wt. % aluminium nitride. This powder mixture was compressed into pellets under a pressure of 5 MPa, and the pellets were subsequently pre-fired at a temperature ranging between 1600 and 1650° C. The heating and cooling rates were 10° C. per minute. After pre-firing of the pellets, they were ground into a powder having an average grain size of approximately 2 micrometers. The powder was of a white colour.

Figure 2:
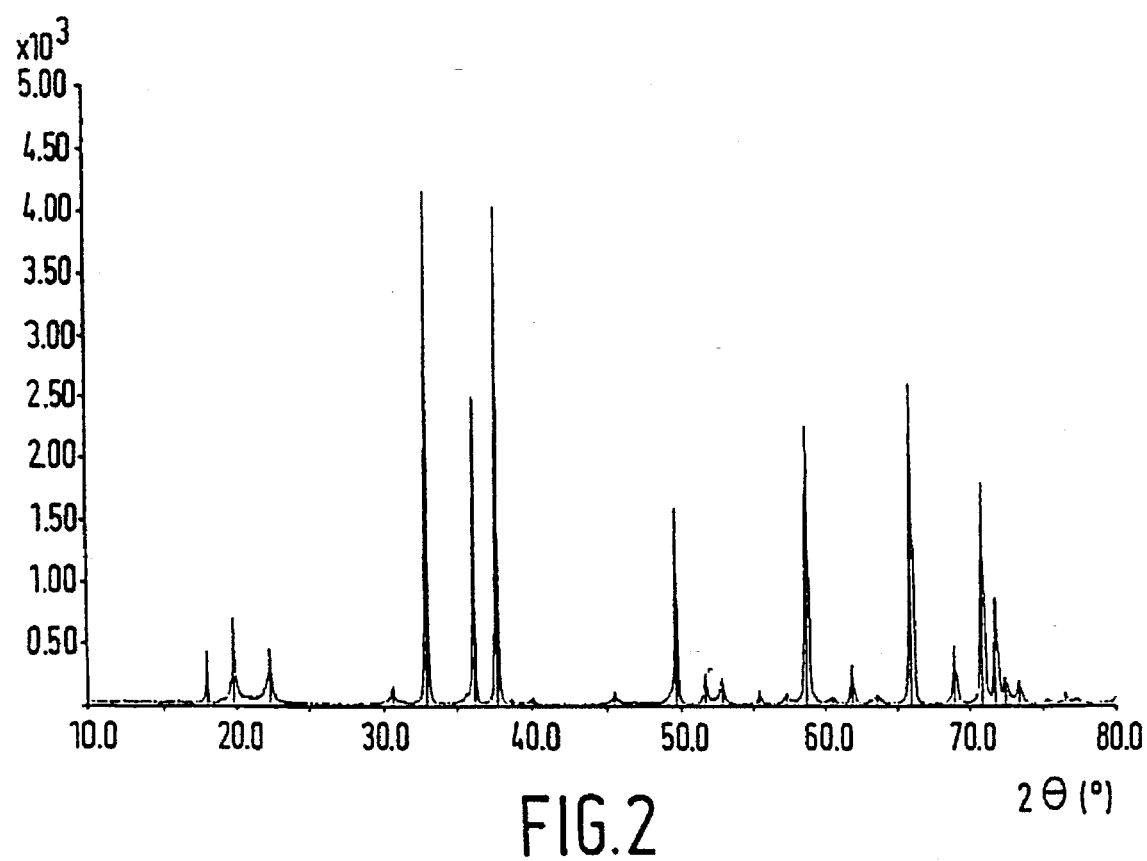
FIG. 2 shows an X-ray diffraction pattern of the ceramic material in accordance with the invention.

An X-ray diffraction pattern was recorded of the powder thus manufactured, as shown in FIG. 2. In this figure, the intensity (random unit) of the radiation measured is plotted as a function of 2 θ (°). The pattern was recorded by means of a Philips PW1800 diffractometer, while using monochromatic Cu-Kα radiation. All the lines of the pattern can be assigned to a rhombohedral structure (R-3 m,#166, wherein a=5.459 Å and c=14.952 Å). This diamond-like structure explains why the material in accordance with the invention has a relatively high heat conductance. It could be derived from this diffraction pattern that the quantity of foreign-phase material is less than 5 wt. %. Element analysis showed that the composition of the ceramic material manufactured corresponded to the formula $Al_{28}O_{21}C_6N_6$. The error in the element analysis is maximally 1 at. %.

The powdered ceramic material having this optimum chemical composition was used to manufacture substrates by means of hot pressing. In this process, approximately 10 g of the powder was pressed by means of a hot-pressing apparatus (HP20, supplier Thermal Technology Ind) to form a flat substrate. The hot-pressed powder was sintered at a pressure of 75 MPa for 3 hours at 1800° C. The heating and cooling rates were 10° C. per minute. After the hot-pressing operation, the substrate was subjected to a number of measurements. The density of the substrate was 97%. The heat conductance of this substrate was found to be above 20 W/m.K. Calculations revealed that the theoretical heat conductance is approximately 141 W/m.K. This can be achieved by optimizing the sintering process. The average coefficient of expansion of the substrate thus manufactured was 4.8× $10^{-6}$ $K^{-1}$. The strength of the material was 295 MPa.

In further experiments, a mixture of the above-mentioned aluminium oxide, aluminium oxycarbide and aluminium nitride were mixed and, immediately afterwards, subjected to a sintering treatment at an increased pressure for 3 hours at 1880°–1900° C. The density of the material obtained ranges between 2.97 and 3.01 g/cm³. A favourable aspect of this so-called "reactive hot sintering method" is that the time-consuming pre-firing step as well as the grinding step can be dispensed with. In this manner, substrates or other mouldings can be manufactured rapidly and at low cost.

In still further experiments, a number of ceramic powders were manufactured, in which the quantity of the various elements of the ceramic material was varied around the above-mentioned optimum composition. Also of these powders an X-ray diffraction pattern was recorded under the same conditions as described hereinabove. The quantity of different-phase material was estimated by means of the surface area of non-assignable peaks. The chemical composition and the corresponding quantity of monophase material (pure phase) are listed in the Table

|    | Composition               | pure phase (%) |
| -- | ------------------------- | -------------- |
| 1. | $Al_{48}O_{29}C_{14}N_9$  | 60             |
| 2. | $Al_{47}O_{31}C_{13}N_9$  | 80             |
| 3. | $Al_{46}O_{35}C_{11}N_{10}$ | 95           |
| 4. | $Al_{46}O_{36}C_{10}N_9$  | 98             |
| 5. | $Al_{46}O_{37}C_{10}N_{10}$ | 90           |
| 6. | $Al_{44}O_{39}C_8N_{11}$  | 80             |
| 7. | $Al_{43}O_{40}C_7N_{11}$  | 30             |

The ceramic materials in accordance with exemplary embodiments 1 and 7 are not in accordance with the invention. The ceramic materials in accordance with exemplary embodiments 2–6 are in accordance with the invention. The Table clearly shows that a monophase material is obtained if the ceramic material in accordance with the invention comprises 44–47 at. % Al, 31–39 at. % O, 8–13 at. % C and 8–12 at. % N.

In summary, the invention relates to a substrate made from a novel type of ceramic material. The material comprises 44–47 at. % Al, 31–39 at. % O, 8–13 at. % C and 8–12 at. % N. Substrates made from this material exhibit a relatively high thermal conductance, a relatively great strength and their coefficient of expansion is equal to that of Si. Consequently, the substrates in accordance with the invention are very suitable for use in the Si-semiconductor technology. The main component of the ceramic material of the substrates preferably corresponds to the formula $Al_{28}O_{21}C_6N_6$. The invention also provides methods of manufacturing substrates and other mouldings from this material.

What is claimed is:

1. A method of manufacturing a substrate of ceramic material comprising 44–47 at. % Al, 31–39 at. % O, 8–13 at. % C and 8–12 at. % N, said method comprising the steps of:

a) pre-firing a mixture of $Al_2O_3$, $Al_4C_3$ and AlN to form a pre-fired product, b) grinding the pre-fired product into a powder, c) sintering the powder to form the substrate of ceramic material.

2. A method as claimed in claim 1, wherein the pre-firing takes place in a temperature range between 1500 and 1700°

C. and the sintering takes place in a temperature range between 1700 and 1900° C.

3. A method of manufacturing a ceramic material comprising 44–47 at. % Al, 31–39 at. % O, 8–13 at. % C and 8–12 at. % N, wherein a mixture of $Al_2O_3$, $Al_4C_3$ and AlN is sintered under pressure to form said ceramic material.

4. A method of manufacturing a ceramic material comprising 44–47 at. % Al, 31–39 at. % O, 8–13 at. % C and 8–12 at. % N, said method comprising the steps of:

a) pre-firing a mixture of $Al_2O_3$, $Al_4C_3$ and AlN to form a pre-fired product, b) grinding the pre-fired product into a powder, c) sintering the powder to form the ceramic material.

5. A method of manufacturing a substrate of ceramic material comprising 44–47 at. % Al, 31–39 at. % O, 8–13 at. % C and 8–12 at. % N, wherein a mixture of $Al_2O_3$, $Al_4C_3$ and AlN, is sintered under pressure to form said substrate of ceramic material.

6. A method as claimed in claim 1, wherein the ceramic material has a main component of $Al_{28}O_{21}C_6N_6$.

7. A method as claimed in claim 3, wherein the ceramic material has a main component of $Al_{28}O_{21}C_6N_6$.

8. A method as claimed in claim 4, wherein the ceramic material has a main component of $Al_{28}O_{21}C_6N_6$.

9. A method as claimed in claim 5, wherein the ceramic material has a main component of $Al_{28}O_{21}C_6N_6$.

10. A method as claimed in claim 4, wherein the pre-firing takes place in a temperature range between 1500 and 1700° C. and the sintering takes place in a temperature range between 1700 and 1900° C.

* * * * *